May 6, 1969  H. G. BURMEISTER  3,443,108
DUAL BEAM SCANNING APPARATUS HAVING DUAL BEAMS SCANNING DUAL
PHOTOCELLS IN OPPOSITE DIRECTIONS WITH RESPECT
TO A CENTERLINE
Filed Oct. 31, 1966
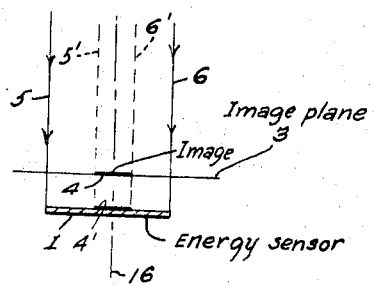
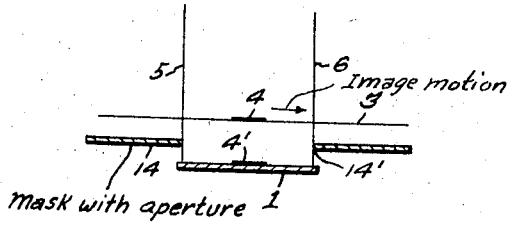
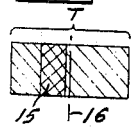 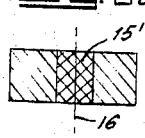 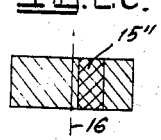
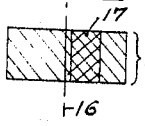 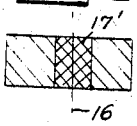 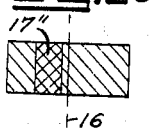
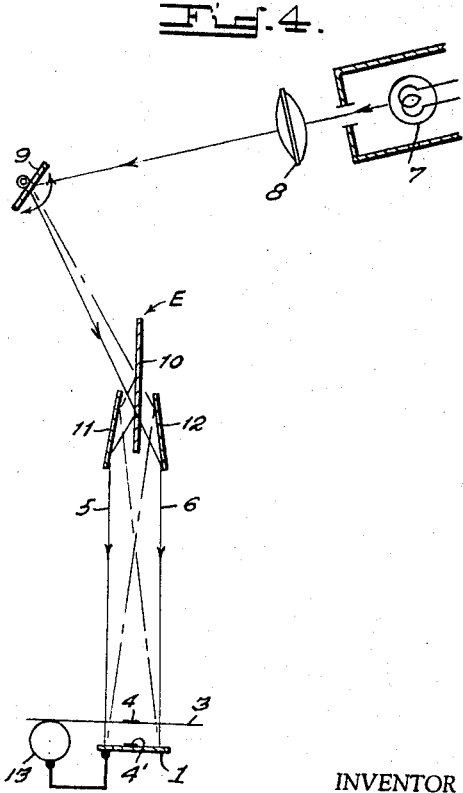
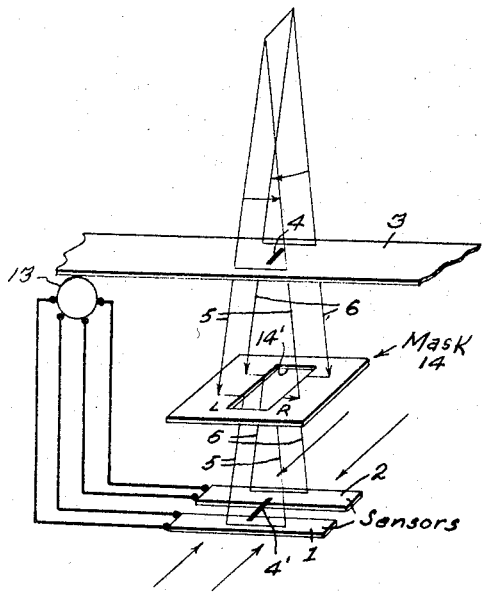
INVENTOR,
Harvey G. Burmeister
BY: Harry M. Saragovitz,
Edward J. Kelly &
Herbert Berl
ATTORNEYS 3,443,108
DUAL BEAM SCANNING APPARATUS HAVING DUAL BEAMS SCANNING DUAL PHOTOCELLS IN OPPOSITE DIRECTIONS WITH RESPECT TO A CENTERLINE
Harvey G. Burmeister, Alamogordo, N. Mex., assignor to the United States of America as represented by the Secretary of the Army
Filed Oct. 31, 1966, Ser. No. 591,381
Int. Cl. G01n 21/30; G05b 21/00
U.S. Cl. 250—219                    6 Claims

ABSTRACT OF THE DISCLOSURE

Scanning beams sweep an image on a film as the image is advanced to a viewing area. The dual beams are received by sensors below the film and the sensors control the drive motor advancing the film. When the image on the film reaches the point where it should be stopped the dual beams' effect on the sensors is such that the drive motor is stopped in proper position for viewing.

The invention described herein may be manufactured and used by or for the Government, for governmental purposes, without the payment to me of any royalty thereon.

Introduction

This invention pertains to apparatus used in reading data, recorded on film, for example. More particularly, it relates to apparatus for precisely centering a frame of data or other indicia to be read.

In the drawing:

FIGS. 1A and 1B are diagrammatic representations of two forms of the invention;

FIGS. 2A, 2B and 2C are diagrammatic representations of the output of energy sensor 1;

FIGS. 3A, 3B and 3C are diagrammatic representations of the output of energy sensor 2;

FIG. 4 is a diagrammatic representation of the energy scanning system;

FIG. 5 is a schematic perspective of the invention.

Brief summary

A reference image 4, a black line on a clear film, for example, moves into the area where the image or other data is to be read. Two scanning beams 5 and 6 move across the image in opposite directions. Sensors 1 and 2 yield electrical outputs E and E'. The outputs are cut out when image 4 is in the paths of the beams, as between 5' and 6'. At the precise moment of time when the zero outputs of both sensors 1 and 2 coincide the image 4 is stopped, dead centered (see 15' and 17' in FIGS. 2B and 3B).

Detailed description

In FIGS. 1A and 5 energy sensors 1 and 2 are located substantially parallel with an image plane 3 having an image 4 thereon, such as a black line image on a clear film for example.

The image plane or film 3, and any image 4 thereon, are constantly scanned or swept over by energy beams 5 and 6. These beams rapidly sweep back and forth in synchronism but in opposite directions. As beam 5 is sweeping to the right toward position 5' beam 6 is sweeping to the left toward position 6'. A shadow 4' of image 4 falls on sensors 1 and 2.

Scanning energy beams 5 and 6 may be produced and moved by various types of apparatus. As exemplary, energy from source 7 may pass through lens 8 to galvanometer mirror 9 and be reflected to beam splitter 10. Components 5 and 6 of the beam are reflected by mirrors 11 and 12. The image plane or film 3, with image 4 thereon, may be actuated, advanced, stopped or reversed by apparatus 13 in response to electrical output of sensors 1 and 2. Apparatus 13 compares the output of sensors 1 and 2 and is operated thereby.

If desired, a mask 14 with an aperture 14' may be used, as illustrated in FIGS. 1B and 5, to "frame" the desired image or area to be scanned.

Operation

Sensors 1 and 2 have an electrical output proportional to the energy from beams 5 and 6 striking them. FIGS. 2A, 2B and 2C illustrate the output of sensor 1 while energy beam 5 sweeps sensor 1 and the shadow 4' of image 4 crosses sensor 1 from left to right in time T. Sensor 1 generates an electrical output E. When image 4 moves into the path of beam 5, as at 5', it reduces or cancels the output of sensor 1 for a brief period of time, as illustrated at 15' in FIG. 2B. Similarly, the output of sensor 2 is reduced as image 4 intercepts beam 6 at 6', as illustrated at 17' in FIG. 3B.

As image 4 and shadow 4' move from left to right shadow 4' falls on sensor 1 at progressively later points in time. Corresponding decreases in electrical output occurs at progressively later points in time, as illustrated at 15, 15' and 15" in FIGS. 2A, 2B and 2C, respectively.

Beam 6 sweeps sensor 2 from the direction opposite the movement of beam 5. Thus, as illustrated in FIG. 3A, the zero output of energy E' of sensor 2 occurs late in the time interval T, as illustrated at 17 in FIG. 3A. As image 4 and shadow 4' move to centerline 16, zero output 17' of sensor 2 occurs at the center of time interval T, the exact same time illustrated at 15' in FIG. 2B. If image 4 and shadow 4' move on to the left of centerline 16 then zero output of sensor 2 will occur progressively to the left, as illustrated at 17" in FIG. 3C.

The electrical output E and E' of sensors 1 and 2 may be used in various ways. As an example, they may be used to control apparatus 13 which compares energy received from sensors 1 and 2 and operates to advance stop or reverse a film 3 with an image 4 thereon. When the image reaches centerline 16 the outputs E and E' drop to zero. Apparatus 13 may be thereby actuated by failure of the electrical output E, E' (such as deenergization of a relay) to stop image 4 dead centered, or substantially so, at centerline 16. Image 4 may be placed in a centered position on a frame of data to be read so as to center and stop the frame.

The apparatus described is only illustrative of the principles involved. As exemplary, instead of galvanometer mirror 9, beam splitter 10 and mirrors 11 and 12, we could substitute contra-rotating prisms, or contra-rotating faceted mirrors, or other apparatus. Also, electrical output or signals from sensors 1 and 2 could be used in ways or for purposes other than those described.

Energy beams 5 and 6 could be light, infra-red, magnetic, ultrasonic or other, with appropriate sensing devices 1, 2. Instead of a black image on a clear film we could use a clear image on black film, or other modification which would suggest itself to one skilled in this art.

I claim:

1. Dual beam image scanning apparatus comprising a pair of sources of energy beams, scanning means including means for moving said beams equidistantly in opposite directions relative to a center reference point during a time interval, a pair of energy sensors located in the paths of said energy beams to receive energy from said beams, and means to compare energy received by said sensors as a function of time, to actuate or deactuate power apparatus, to cause the centering of energy transmission modifying material in the area between said sources of energy beams and said sensors.

2. Apparatus as in claim 1 wherein said power apparatus moves the energy transmission modifying material in the area between said sources of energy beams and said sensors.

3. Apparatus as in claim 1 wherein said scanning means comprises a light beam source, an oscillating galvanometer mirror positioned in said light beam source to reflect the beam, a beam splitter positioned to intercept the reflected beam and split it, and a pair of mirrors positioned to intercept the split beam components and project them onto said energy sensors.

4. Apparatus as in claim 1 and a mask with an aperture therein with equal amounts of energy transmitting areas on each side of said center reference point.

5. The method of centering indicia in a reference frame comprising; passing a pair of energy beams across a space, locating a pair of energy sensors in the path of said energy beams, moving said energy beams equidistantly in opposite directions to scan or sweep said energy sensors equally during a time interval, locating energy transmission modifying indicia in the area between said energy beams and said sensors and comparing energy output from said sensors as a function of time, such that sensor energy output of the two sensors will be modified at the same instant when said energy transmission modifying indicia is equidistant from the ends of movement of the scanning beams.

6. The method of claim 5 and further comprising passing energy output from said sensors to apparatus for controlling movement of said energy transmission-modifying indicia in the area between said energy beams and said sensors to stop said indicia at a desired location.

References Cited

UNITED STATES PATENTS 2,489,305  11/1949  McLennan _____ 250—202
3,164,721  1/1965  Astheimer _____ 250—211

RALPH G. NILSON, *Primary Examiner.*

M. ABRAMSON, *Assistant Examiner.*

U.S. Cl. X.R.
250—202